(12) United States Patent
Sun

(10) Patent No.: US 8,792,747 B2
(45) Date of Patent: Jul. 29, 2014

(54) IMAGE PROCESSING METHOD AND DEVICE, AND MEDICAL IMAGING INSTRUMENT

(75) Inventor: Wenwu Sun, Shenzhen (CN)

(73) Assignee: Shenzhen Mindray Bio-Medical Electronics Co., Ltd., Shenzhen (CN)

( * ) Notice: Subject to any disclaimer, the term of this patent is extended or adjusted under 35 U.S.C. 154(b) by 366 days.

(21) Appl. No.: 13/095,566

(22) Filed: Apr. 27, 2011

(65) Prior Publication Data
US 2012/0014583 A1    Jan. 19, 2012

(30) Foreign Application Priority Data
Jul. 15, 2010    (CN) .......................... 2010 1 0227818

(51) Int. Cl.
*G06K 9/40* (2006.01)
*G06T 5/00* (2006.01)

(52) U.S. Cl.
CPC ....... *G06T 5/004* (2013.01); *G06T 2207/20208* (2013.01); *G06T 5/009* (2013.01); *G06T 2207/20016* (2013.01); *G06T 2207/10116* (2013.01)
USPC ...................................................... 382/274

(58) Field of Classification Search
USPC ........ 345/617; 348/355, E5.119; 375/E7.205; 382/274
See application file for complete search history.

(56) References Cited

U.S. PATENT DOCUMENTS

| 8,111,265 | B2 * | 2/2012 | Kerofsky et al. ............ 345/611 |
| 2003/0035584 | A1 * | 2/2003 | Nicolas et al. ............ 382/232 |
| 2003/0118226 | A1 | 6/2003 | Winsor et al. |
| 2007/0165925 | A1 * | 7/2007 | Ahn et al. ............... 382/128 |
| 2009/0245689 | A1 | 10/2009 | Panetta et al. |
| 2010/0092102 | A1 | 4/2010 | Sun |
| 2010/0142790 | A1 * | 6/2010 | Chang ................... 382/132 |

FOREIGN PATENT DOCUMENTS

| CN | 100336080 C | 7/2006 |
| CN | 1843296 A | 10/2006 |
| CN | 10410969 C | 1/2007 |
| CN | 101727658 A | 6/2010 |

OTHER PUBLICATIONS

Guo, Min et al., A Method of Medical Ultrasonic Image Denoising and Enhancement Based on Wavelet Transform, Chin J Med Imaging Technol, 2006, pp. 1435-1437, vol. 22, No. 9.

Wang, Shao-Bo et al., A Method of Medical Ultrasonic Image Enhancement Based on Self-Adaptive Low Pass Filter, Chin J Med Imaging Technol, 2009, pp. 492-495, vol. 25, No. 3.

* cited by examiner

*Primary Examiner* — Gregory F Cunningham
(74) *Attorney, Agent, or Firm* — Kory D. Christensen; Stoel Rives LLP

(57) ABSTRACT

An image processing method and device, and a medical instrument are provided to perform equalization processing on a residual image obtained by decomposing an input image, and perform composition processing on the equalized residual image and a detail image obtained by decomposing the input image to obtain a result image.

13 Claims, 2 Drawing Sheets

IMAGE PROCESSING METHOD AND DEVICE, AND MEDICAL IMAGING INSTRUMENT

CROSS-REFERENCE TO RELATED APPLICATION(S)

This application claims the benefit of Chinese Patent Application No. 201010227818.9, filed on Jul. 15, 2010, which is incorporated herein by reference in its entirety.

TECHNICAL FIELD

The following disclosure relates to image processing.

SUMMARY OF THE INVENTION

Disclosed herein are an image processing method, device, and medical instrument to perform equalization processing on a residual image obtained by decomposing an input image and to perform composition processing on the equalized residual image and a detail image obtained by decomposing the input image to obtain a result image.

DETAILED DESCRIPTION

Digital Radiography (DR) is a growing trend in X-ray imaging systems for medical examination. An image obtained by radiography has a wide dynamic range, and the contrast of fine details is not high so as to render some details difficult to discern. In order to enable a processed image to present rich information of tissue layers, the dynamic range of the image needs to be compressed. The dynamic range of the image can be compressed by narrowing down differences between pixel values of the image. According to one method, a low-pass filter is used to input a smoothed image, and gain adjustment is performed on each pixel value of the input image, so as to narrow down differences between the pixel values of the image, thus compressing the dynamic range of the image. However, because each of the pixel values of the input image is adjusted directly, subtle details may be lost. Such details are usually important, especially for a DR image obtained by a medical imaging instrument, and many diagnostic results are drawn based on the details.

Accordingly, the present disclosure is directed to an image processing method and device, and a medical imaging instrument, which can not only compress a dynamic range of an image, but also reduce the loss of detail.

In one aspect, the present disclosure provides an image processing method, including: decomposing an input image to obtain a residual image and a detail image; performing equalization processing on the residual image; and performing composition processing on the equalized residual image and the detail image to obtain a result image.

In another aspect, the present disclosure provides an image processing device, including: an image decomposition unit configured for decomposing an input image to obtain a residual image and a detail image; an image equalization unit configured for performing equalization processing on the residual image; and an image composition unit configured for performing composition processing on the equalized residual image and the detail image to obtain a result image.

In another aspect, the present disclosure further provides a medical imaging instrument including the aforementioned image processing device.

Figure 1:
FIG. 1 is a schematic structural view of an image processing device.

As shown in FIG. 1, an image processing device may include an image decomposition unit 1, an image equalization unit 4, and an image composition unit 5. In one embodiment, the image decomposition unit 1 first decomposes an input image to obtain a residual image and a detail image. Then, the image equalization unit 4 performs equalization processing on the residual image, so as to narrow down differences between pixel values of different areas of the residual image. Finally, the image composition unit 5 performs composition processing on the equalized residual image and the detail image to obtain a result image.

Figure 2:
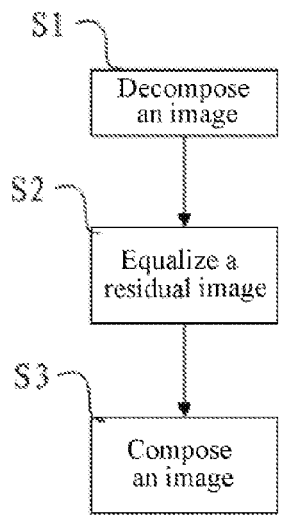
FIG. 2 is a flow chart of an image processing method.

Differences between pixel values of different areas of an input image are mainly reflected by those differences between pixel values in different areas of a residual image and are almost independent of details of the input image. Although direct equalization processing on each of the pixel values of the input image can narrow down the differences between the pixel values of the image, subtle details are lost. Therefore, an image processing method, as shown in FIG. 2, includes the following steps.

In Step S1, an input image is first decomposed into a detail image containing detail information and a residual image.

In Step S2, equalization processing is performed on pixel values of the residual image, so as to narrow down differences between pixel values of the residual image.

In Step S3, the equalized residual image and the detail image previously obtained by decomposition are composed to obtain a result image.

Since the equalization processing is only performed on the residual image, the dynamic range of the residual image is compressed while the detail image is not damaged, and the contrast of the detail image is retained. For the result image obtained by composing the detail image and the equalized residual image, not only are image details retained, but also a smaller image dynamic range is achieved. Therefore, the image equalization processing method reduces the dynamic range of the image while reducing the loss of the detail information.

Figure 3:
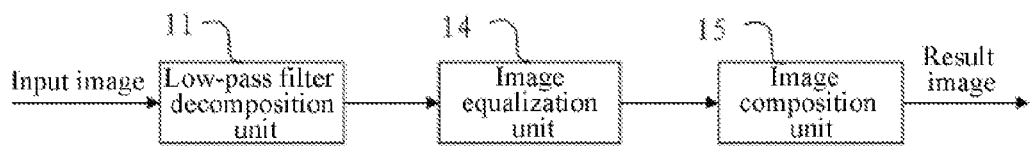
FIG. 3 is a schematic structural view of an image processing device.

The embodiment shown in FIG. 3 is illustrated using a digital X-ray imaging instrument for medical examination as an example. However, a skilled artisan will recognize that the principles disclosed herein could be applicable in other contexts. In one embodiment, the X-ray imaging instrument includes an X-ray generator for generating X-rays, an image receiving device, an image processing device, and a control circuit. The image receiving device outputs a digital image to the image processing device.

In one embodiment, the image processing device includes a low-pass filter unit 11 for image decomposition, an equalization unit 14, and a composition unit 15. The low-pass filter unit 11 may adopt a large-size filter template, performing low-pass filtering on an input image to obtain a filtered residual image, and subtracting the residual image from the input image to obtain a detail image. That is, the original input image is decomposed into the residual image and the detail image, as expressed by the following formula:

$$I[i,j] = I_{low}[i,j] + I_{high}[i,j] \qquad (1).$$

In formula (1), I is the input image, $I_{low}$ is the residual image, $I_{high}$ is the detail image, and i and j are pixel coordinates.

The equalization unit 14 performs equalization processing on the residual image, and inputs the equalized residual image into the composition unit 15, so that the residual image and the detail image are composed to obtain a result image.

In order to equalize the residual image, in this embodiment, a function for performing gain adjustment on each pixel value of the residual image is constructed, a gain coefficient of each of the pixel values of the residual image is calculated through the function, an adjusted pixel value is obtained by multiplying each of the pixel values of the residual image by the gain coefficient, and the gain coefficient makes the adjusted pixel value of each of the pixels of the residual image to be closer to a set value, thus narrowing down the differences between the pixels of the residual image. For example, the gain coefficient is a function of the pixel value of the residual image, and varies with the pixel value of the residual image. In one embodiment, the gain coefficient satisfies the following conditions: when a pixel value of the residual image is smaller than the set value, a larger difference between the pixel value and the set value results in a larger gain coefficient; and when a pixel value of the residual image is greater than the set value, a larger difference between the pixel value and the set value results in a smaller gain coefficient.

As an example, the set value for being compared with the pixel value of each of the pixels of the residual image may be preset as an average value of all of the pixel values of the residual image or a set multiple of the average value. The set value may be the average value, or a certain multiple of the average value, or a fraction of the average value. A larger difference between a pixel value of the residual image and the set value results in a larger difference between a gain coefficient corresponding to the pixel value and 1.0. That is, larger differences between the pixel values of the residual image smaller than the set value and the set value result in larger differences between the corresponding gain coefficients greater than 1.0 and 1.0; and larger differences between the pixel values of the residual image greater than the set value result in larger differences between the corresponding gain coefficients smaller than 1.0 and 1.0. An equalized pixel value is obtained by multiplying the original pixel value by the gain coefficient.

For a pixel value $I_{low}[i,j]$ of the residual image and a set value H, the equalization unit 14 generates a gain coefficient $g[i,j]$ for performing gain adjustment on the pixel value $I_{low}[i,j]$ according to a function $f$ in the following formula (2).

$$g[i,j]=f(I_{low}[i,j],H,c) \quad (2)$$

In formula (2), c is a parameter for controlling the extent of equalization, a range of c may be between any two real numbers, and, for example, c may range from 0.0 to 1.0 or from 1 to 10. When c is one of the limits of the range thereof, the image equalization effect is the weakest. On the other hand, when c is the other limit of the range thereof, the image equalization effect is the strongest. The range of the set value H usually corresponds to a range of pixel values of an area of interest, and the set value H may be obtained by multiplying the average value of the residual image by a real number k greater than 0. For example, k may be 1, 2.6, 4, 6.5, 23, etc. The function $f$ monotonically decreases with $I_{low}[i,j]$, and a larger difference between $I_{low}[i,j]$ and the set value H results in a larger difference between a function value $f$ and 1.0. That is, a larger difference between $I_{low}[i,j]$ greater than the set value H and the set value results in a larger difference between the function value $f$ smaller than 1.0 and 1.0; and a larger difference between $I_{low}[i,j]$ smaller than the set value H and the set value results in a larger difference between the function value $f$ greater than 1.0 and 1.0. The function $f$ may be constructed by many methods, one of which is shown by a formula (3).

$$f(I_{low}[i,j],H,c) = \frac{H}{H \cdot (1.0-c) + c \cdot I_{low}[i,j]} \quad (3)$$

As can be seen from formula (3), when the parameter c is 0, the function $f$ is constant, and is 1, and the image is not equalized. In addition, another method for constructing the function $f$ is shown by a formula (4).

$$f(I_{low}[i,j],H,c) = \frac{1}{1.0-c+c\cdot e^{\left(\frac{I_{low}[i,j]}{H}-1\right)}} \quad (4)$$

In addition, a process of performing gain adjustment on the pixel value $I_{low}[i,j]$ of the residual image according to a gain coefficient $g[i,j]$ generated by the function $f$ may be expressed by a formula (5).

$$I'_{low}[i,j]=I_{low}[i,j] \times g[i,j] \quad (5)$$

In formula (5), $I'_{low}[i,j]$ is an equalized pixel value, and $g[i,j]$ is a gain coefficient shown in formula (2).

In all the formulas above, the gain coefficient is dependent on the parameter c, and may also be independent of the parameter c, that is, the function $f$ is a function involving $I_{low}[i,j]$ and the set value H.

Since the result image in this embodiment is obtained by combining the detail image obtained by decomposing and the equalized residual image, no detail information is lost, the whole equalization process is simple, and the composed result image has an equalized effect.

Figure 4:
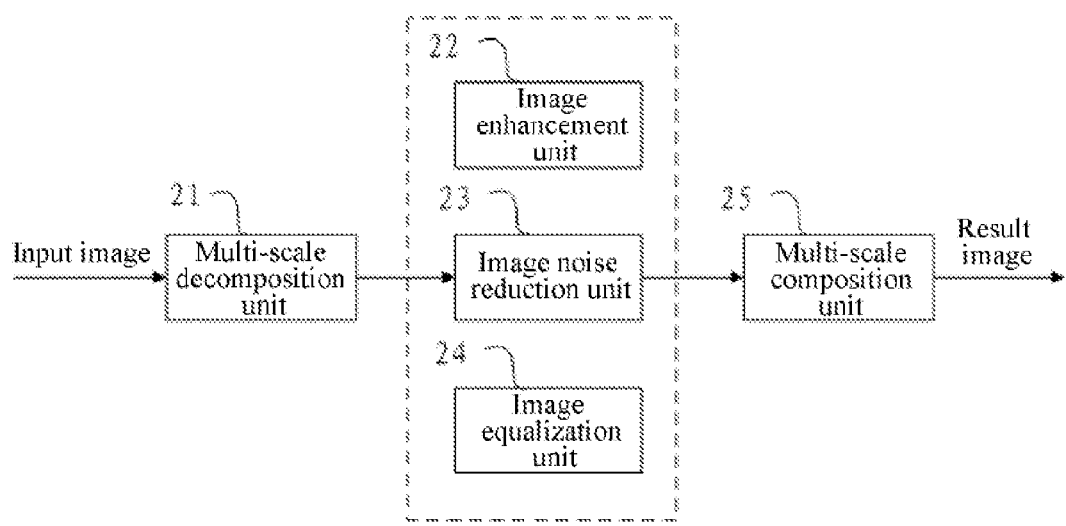
FIG. 4 is a schematic structural view of an image processing device.

In another embodiment, as shown in FIG. 4, an image processing device includes a multi-scale decomposition unit 21 for decomposing an image, an equalization unit 24, and a composition unit 25. An image equalization process is substantially the same as that in the embodiment shown in FIG. 3, and main differences lie in an image decomposition process and a composition process. The decomposition unit 21 shown in FIG. 4 uses a multi-scale decomposition method to decompose an input image into a series of detail images of different scales and a final residual image. During decomposition, as the level of the decomposition goes gradually deeper, the size of the corresponding detail image gradually decreases. Since the composition process is inverse to the decomposition process, the composition unit 25 shown in FIG. 3 is first required to perform size extension on the equalized residual image, so as to extend the size thereof to be equal to the size of the detail image of the deepest level (assuming that N is the deepest level), and then combines the extended residual image and the detail image of the deepest level, so as to obtain an intermediate image of the Nth level. Then, the size extension is performed on the intermediate image, so that the extended size thereof is equal to the size of a detail image of a less deep level (that is, the (N−1)th level), and the intermediate image and the detail image of the less deep level are composed, so as to obtain an intermediate image of the (N−1)th level. The process is repeated until the size extension is performed on an intermediate image of the second level to extend the size thereof to be equal to the size of the detail image of the first level. The extended intermediate image of the second level is superimposed on the detail image of the first level, so as to finally obtain a composed result image of the same size as the input image.

Since the multi-scale decomposition method adopted in this embodiment can discriminate details of different scales, more flexible operations, such as detail enhancement, may be further performed on the different details in this embodiment, as shown in FIG. 4. In this embodiment, besides equalizing the residual image, the details of all the levels are enhanced to different extents, and noise amplified due to the enhancement of the details is also suppressed. Therefore, the image processing device may further include an image enhancement unit 22 and an image noise reduction unit 23.

The aforementioned embodiments may be applied to various medical imaging instruments, such as an X-ray imaging instrument and an ultrasound instrument. While specific embodiments and applications of various methods and systems have been illustrated and described, it is to be understood that the invention claimed hereinafter is not limited to the precise configuration and components disclosed. Various modifications, changes, and variations apparent to those of skill in the art may be made in the arrangement, operation, and details of the methods and systems disclosed.

Furthermore, the methods disclosed herein comprise one or more steps or actions for performing the described method. The method steps and/or actions may be interchanged with one another. In other words, unless a specific order of steps or actions is required for proper operation of the embodiment, the order and/or use of specific steps and/or actions may be modified without departing from the scope of the invention as claimed.

The embodiments disclosed may include various steps, which may be embodied in machine-executable instructions to be executed by a general-purpose or special-purpose computer (or other electronic device). Alternatively, the steps may be performed by hardware components that contain specific logic for performing the steps, or by any combination of hardware, software, and/or firmware.

Embodiments of the present invention may also be provided as a computer program product including a non-transitory computer-readable medium having stored thereon instructions that may be used to program a computer (or other electronic device) to perform processes described herein. The computer-readable medium may include, but is not limited to, floppy diskettes, optical disks, CD-ROMs, DVD-ROMs, ROMs, RAMs, EPROMs, EEPROMs, magnetic or optical cards, or other type of media suitable for storing electronic instructions.

Those of skill in the art will appreciate that the various illustrative logical blocks, modules, circuits, and algorithm steps described in connection with the embodiments disclosed herein may be implemented as electronic hardware, computer software, or combinations of both. To illustrate the interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the invention as claimed hereinafter.

What is claimed is:

1. A computer-implemented image processing method, comprising:

decomposing an input image to obtain a residual image and a detail image;

performing equalization processing on the residual image; and performing composition processing on the detail image and the equalized residual image to obtain a result image;

wherein decomposing the input image comprises using a multi-scale decomposition method to decompose the input image into a series of detail images of different scales and a final residual image; and wherein composition processing comprises:

performing size extension on the equalized residual image, so as to extend the size thereof to be equal to the size of the detail image of an $N^{th}$ level, wherein the $N^{th}$ level is a deepest level;

superimposing the extended residual image on the detail image of the deepest level, so as to obtain an intermediate image of the $N^{th}$ level;

performing the size extension on the intermediate image of the $N^{th}$ level, so as to extend the size thereof to be equal to the size of the detail image of an $(N-1)^{th}$ level;

superimposing the extended intermediate image of the $N^{th}$ level on the detail image of the $(N-1)^{th}$ level, so as to obtain an intermediate image of the $(N-1)^{th}$ level; and repeating the process until the size extension is performed on an intermediate image of a second level to extend the size thereof to be equal to the size of the detail image of a first level, and the extended intermediate image of the second level is superimposed on the detail image of the first level, so as to obtain the result image of the same size as the input image.

2. The image processing method according to claim 1, wherein performing the equalization processing on the residual image comprises: calculating a gain coefficient of each pixel value of the residual image, and multiplying each of the pixel values of the residual image by the gain coefficient to obtain an adjusted pixel value, such that the gain coefficient makes the adjusted pixel value of each of the pixels of the residual image be closer to a set value.

3. The image processing method according to claim 2, wherein the gain coefficient is a function of the pixel value of the residual image, and the gain coefficient satisfies the following conditions: when a pixel value of the residual image is smaller than the set value, a larger difference between the pixel value and the set value results in a larger gain coefficient; and when a pixel value of the residual image is greater than the set value, a larger difference between the pixel value and the set value results in a smaller gain coefficient.

4. The image processing method according to claim 3, wherein a formula for calculating the gain coefficient is:

$$g[i,j] = \frac{H}{H \cdot (1.0 - c) + c \cdot I_{low}[i,j]} \text{ or}$$

$$g[i,j] = \frac{1}{1.0 - c + c \cdot e^{\left(\frac{I_{low}[i,j]}{H} - 1\right)}},$$

where, $g[i,j]$ is a gain coefficient, $I_{low}[i,j]$ is a pixel value of the residual image, H is the set value, and c is a parameter for controlling the extent of equalization.

5. The image processing method according to claim 1, wherein decomposing the input image comprises:

performing low-pass filtering on the input image to obtain the residual image; and subtracting the residual image from the input image to obtain the detail image.

6. An image processing device, comprising:

an image decomposition unit configured for decomposing an input image to obtain a residual image and a detail image;

an image equalization unit configured for performing equalization processing on the residual image; and an image composition unit configured for performing composition processing on the detail image and the equalized residual image to obtain a result image;

wherein the image equalization unit calculates a gain coefficient of each pixel value of the residual image, and multiplies each of the pixel values of the residual image by the gain coefficient to obtain an adjusted pixel value, such that the gain coefficient makes the adjusted pixel value of each of the pixels of the residual image be closer to a set value;

wherein the gain coefficient is a function of the pixel value of the residual image, and the gain coefficient satisfies the following conditions: when a pixel value of the residual image is smaller than the set value, a larger difference between the pixel value and the set value results in a larger gain coefficient; and when a pixel value of the residual image is greater than the set value, a larger difference between the pixel value and the set value results in a smaller gain coefficient; and wherein the set value is an average value of all of the pixel values of the residual image or a set multiple of the average value, and the set multiple is a positive number greater than 0; when the pixel value of the residual image is equal to the set value, the gain coefficient is 1; when the pixel value of the residual image is smaller than the set value, the gain coefficient is greater than 1, and a larger difference between the pixel value and the set value results in a larger difference between the gain coefficient and 1; and when the pixel value of the residual image is greater than the set value, the gain coefficient is smaller than 1, and a larger difference between the pixel value and the set value results in a larger difference between the gain coefficient and 1.

7. The image processing device according to claim 6, wherein a formula for calculating the gain coefficient is:

$$g[i, j] = \frac{H}{H \cdot (1.0 - c) + c \cdot I_{low}[i, j]} \text{ or}$$

$$g[i, j] = \frac{1}{1.0 - c + c \cdot e^{\left(\frac{I_{low}[i,j]}{H} - 1\right)}},$$

where, $g[i, j]$ is a gain coefficient, $I_{low}[i, j]$ is a pixel value of the residual image, H is the set value, and c is a parameter for controlling the extent of equalization.

8. The image processing device according to claim 6, wherein the image decomposition unit comprises:

a low-pass filtering subunit configured for performing low-pass filtering on the input image to obtain the residual image; and a subtraction subunit configured for subtracting the residual image from the input image to obtain the detail image.

9. The image processing device according to claim 6, wherein the image decomposition unit uses a multi-scale decomposition method to decompose the input image into a series of detail images of different scales and a final residual image.

10. The image processing device according to claim 9, wherein the image composition unit comprises a size extension subunit for extending the size of an image, an image superimposing subunit, and a judgment subunit; the size extension subunit performs size extension on the equalized residual image or an intermediate image of an $M^{th}$ level to extend the size to be equal to the size of the detail image of a corresponding level, the residual image corresponds to the detail image of an $N^{th}$ level, the intermediate image of the $M^{th}$ level corresponds to the detail image of the $M^{th}$ level, the $N^{th}$ level is the deepest level, M is a positive integer smaller than N, and M decreases as the number of times of the extension increases; the image superimposing subunit is used for superimposing the residual image extended by the size extension subunit on the detail image of the $N^{th}$ level to obtain an intermediate image of the $N^{th}$ level, or superimposing the intermediate image of the $M^{th}$ level extended by the size extension subunit on the detail image of an $(M-1)^{th}$ level to obtain an intermediate image of the $(M-1)^{th}$ level; and the judgment subunit is used for judging whether an intermediate image output by the image superimposing subunit is an intermediate image of a first level, and if yes, stopping inputting the superimposed intermediate image to the size extension subunit; otherwise, continuing inputting the superimposed intermediate image to the size extension subunit.

11. A computer-implemented image processing method, comprising:

decomposing an input image to obtain a residual image and a detail image;

performing equalization processing on the residual image; and performing composition processing on the detail image and the equalized residual image to obtain a result image;

wherein performing the equalization processing on the residual image comprises calculating a gain coefficient of each pixel value of the residual image, and multiplying each of the pixel values of the residual image by the gain coefficient to obtain an adjusted pixel value, such that the gain coefficient makes the adjusted pixel value of each of the pixels of the residual image be closer to a set value;

wherein the gain coefficient is a function of the pixel value of the residual image, and the gain coefficient satisfies the following conditions: when a pixel value of the residual image is smaller than the set value, a larger difference between the pixel value and the set value results in a larger gain coefficient; and when a pixel value of the residual image is greater than the set value, a larger difference between the pixel value and the set value results in a smaller gain coefficient; and wherein a formula for calculating the gain coefficient is:

$$g[i, j] = \frac{H}{H \cdot (1.0 - c) + c \cdot I_{low}[i, j]} \text{ or}$$

$$g[i, j] = \frac{1}{1.0 - c + c \cdot e^{\left(\frac{I_{low}[i,j]}{H} - 1\right)}},$$

where, $g[i, j]$ is a gain coefficient, $I_{low}[i, j]$ is a pixel value of the residual image, H is the set value, and c is a parameter for controlling the extent of equalization.

12. An image processing device, comprising:
   an image decomposition unit configured for decomposing an input image to obtain a residual image and a detail image;
   an image equalization unit configured for performing equalization processing on the residual image; and
   an image composition unit configured for performing composition processing on the detail image and the equalized residual image to obtain a result image;
   wherein the image equalization unit calculates a gain coefficient of each pixel value of the residual image, and multiplies each of the pixel values of the residual image by the gain coefficient to obtain an adjusted pixel value, such that the gain coefficient makes the adjusted pixel value of each of the pixels of the residual image be closer to a set value;
   wherein the gain coefficient is a function of the pixel value of the residual image, and the gain coefficient satisfies the following conditions: when a pixel value of the residual image is smaller than the set value, a larger difference between the pixel value and the set value results in a larger gain coefficient; and when a pixel value of the residual image is greater than the set value, a larger difference between the pixel value and the set value results in a smaller gain coefficient; and
   wherein a formula for calculating the gain coefficient is:

$$g[i,j] = \frac{H}{H \cdot (1.0 - c) + c \cdot I_{low}[i,j]} \text{ or}$$

$$g[i,j] = \frac{1}{1.0 - c + c \cdot e^{\left(\frac{I_{low}[i,j]}{H} - 1\right)}},$$

where, $g[i,j]$ is a gain coefficient, $I_{low}[i,j]$ is a pixel value of the residual image, $H$ is the set value, and $c$ is a parameter for controlling the extent of equalization.

13. An image processing device, comprising:
   an image decomposition unit configured for decomposing an input image to obtain a residual image and a detail image;
   an image equalization unit configured for performing equalization processing on the residual image; and
   an image composition unit configured for performing composition processing on the detail image and the equalized residual image to obtain a result image;
   wherein the image decomposition unit uses a multi-scale decomposition method to decompose the input image into a series of detail images of different scales and a final residual image; and
   wherein the image composition unit comprises a size extension subunit for extending the size of an image, an image superimposing subunit, and a judgment subunit; the size extension subunit performs size extension on the equalized residual image or an intermediate image of an $M^{th}$ level to extend the size to be equal to the size of the detail image of a corresponding level, the residual image corresponds to the detail image of an $N^{th}$ level, the intermediate image of the $M^{th}$ level corresponds to the detail image of the $M^{th}$ level, the $N^{th}$ level is the deepest level, M is a positive integer smaller than N, and M decreases as the number of times of the extension increases; the image superimposing subunit is used for superimposing the residual image extended by the size extension subunit on the detail image of the $N^{th}$ level to obtain an intermediate image of the $N^{th}$ level, or superimposing the intermediate image of the $M^{th}$ level extended by the size extension subunit on the detail image of an $(M-1)^{th}$ level to obtain an intermediate image of the $(M-1)^{th}$ level; and the judgment subunit is used for judging whether an intermediate image output by the image superimposing subunit is an intermediate image of a first level, and if yes, stopping inputting the superimposed intermediate image to the size extension subunit; otherwise, continuing inputting the superimposed intermediate image to the size extension subunit.

* * * * *